United States Patent
Tomita

(10) Patent No.: US 10,534,244 B2
(45) Date of Patent: Jan. 14, 2020

(54) PROJECTOR AND METHOD FOR CONTROLLING PROJECTOR TO COMMUNICATE WITH AN EXTERNAL INSTRUMENT

(71) Applicant: SEIKO EPSON CORPORATION, Tokyo (JP)

(72) Inventor: Kenichiro Tomita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/757,954

(22) PCT Filed: Aug. 31, 2016

(86) PCT No.: PCT/JP2016/003971
§ 371 (c)(1),
(2) Date: Mar. 6, 2018

(87) PCT Pub. No.: WO2017/043049
PCT Pub. Date: Mar. 16, 2017

(65) Prior Publication Data
US 2018/0252991 A1 Sep. 6, 2018

(30) Foreign Application Priority Data
Sep. 8, 2015 (JP) .................................. 2015-176288

(51) Int. Cl.
*G03B 21/14* (2006.01)
*G09G 5/00* (2006.01)
(Continued)

(52) U.S. Cl.
CPC ......... *G03B 21/142* (2013.01); *G03B 21/147* (2013.01); *G06F 13/14* (2013.01);
(Continued)

(58) Field of Classification Search
CPC .... G03B 21/142; G03B 21/14; G03B 21/147; G06F 13/00; G06F 13/14; G06F 13/38; G09G 5/00; H04N 5/74; H04W 84/12
See application file for complete search history.

(56) References Cited

U.S. PATENT DOCUMENTS

2003/0117532 A1* 6/2003 Karasawa .......... H04N 5/44582
348/734
2005/0086287 A1 4/2005 Datta
(Continued)

FOREIGN PATENT DOCUMENTS

JP 2006-178896 A 7/2006
JP 2007-513401 A 5/2007
(Continued)

OTHER PUBLICATIONS

Nov. 22, 2016 International Search Report issued in International Patent Application No. PCT/JP2016/003971.
(Continued)

*Primary Examiner* — Cara E Rakowski
*Assistant Examiner* — Magda Cruz
(74) *Attorney, Agent, or Firm* — Oliff PLC

(57) ABSTRACT

An external instrument that wirelessly communicates with a projector is allowed to communicate with a communication counterpart other than the projector. A projector includes a projection section, a communication section, which wirelessly communicates with a first apparatus and communicates with a second apparatus, an evaluation section, which determines the destination of communication data received via the communication section, and a control section. In a case where the evaluation section determines that the destination of the communication data is the projector, the control section causes the projection section to project an image based on image data included in the communication data. In a case where the evaluation section determines that
(Continued)

the destination of the communication data received from the first apparatus is not the projector, the control section causes the communication section to transmit the communication data to the second apparatus.

11 Claims, 6 Drawing Sheets

(51) Int. Cl.
  *H04N 5/74*   (2006.01)
  *H04W 84/12*   (2009.01)
  *G06F 13/14*   (2006.01)
  *G06F 13/38*   (2006.01)

(52) U.S. Cl.
  CPC ............... *G06F 13/38* (2013.01); *G09G 5/00* (2013.01); *H04N 5/74* (2013.01); *H04W 84/12* (2013.01)

(56) References Cited

U.S. PATENT DOCUMENTS

| | | | |
|---|---|---|---|
| 2010/0238860 A1* | 9/2010 | Ota | H04W 64/003 |
| | | | 370/328 |
| 2012/0236131 A1* | 9/2012 | Kishimoto | H04N 13/341 |
| | | | 348/54 |
| 2013/0162607 A1* | 6/2013 | Ichieda | G03B 21/14 |
| | | | 345/204 |
| 2013/0201978 A1 | 8/2013 | Iyer et al. | |
| 2013/0223421 A1 | 8/2013 | Gundavelli et al. | |
| 2013/0250358 A1 | 9/2013 | Suzuki | |
| 2014/0043516 A1* | 2/2014 | Baker | G03B 21/14 |
| | | | 348/333.1 |
| 2014/0268236 A1 | 9/2014 | Ohara et al. | |
| 2015/0116602 A1 | 4/2015 | Watanabe | |
| 2015/0338724 A1* | 11/2015 | Tsukagoshi | G03B 21/147 |
| | | | 353/69 |

FOREIGN PATENT DOCUMENTS

| | | | |
|---|---|---|---|
| JP | 2009-003323 A | 1/2009 | |
| JP | 2010-187168 A | 8/2010 | |
| JP | 2014-179017 A | 9/2014 | |
| JP | 2015-118600 A | 6/2015 | |

OTHER PUBLICATIONS

Apr. 4, 2019 Extended European Search Report issued in European Patent Application No. 16843917.2.

\* cited by examiner

PROJECTOR AND METHOD FOR CONTROLLING PROJECTOR TO COMMUNICATE WITH AN EXTERNAL INSTRUMENT

TECHNICAL FIELD

The present invention relates to a projector and a method for controlling the projector.

BACKGROUND ART

There has been a known projector having an access point function and capable of connecting an external instrument, such as a personal computer (PC), to the projector (see PTL 1, for example). In the configuration described in PTL 1, an image signal apparatus, such as a PC equipped with a wireless LAN, is connected to the wireless projector having the access point function, and the projector projects an image displayed on a display screen of the image signal apparatus.

CITATION LIST

Patent Literature

PTL 1: JP-A-2010-187168

SUMMARY OF INVENTION

Technical Problem

In the configuration described in PTL 1, the image signal apparatus is connected as a client to a projector equipped with the access point function. Since the image signal apparatus, such as a PC, is typically configured to be connected to one access point selected by the image signal apparatus, the image signal apparatus cannot communicate, during the communication with the projector, with a communication counterpart other than the projector, which is an access point. Therefore, to allow the image signal apparatus connected to the projector to communicate with another communication counterpart (for example, to connect to the Internet for website browsing), another communication path, such as a mobile phone communication network, is required.

The invention has been made in view of the circumstances described above, and an object of the invention is to allow an external instrument that wirelessly communicates with a projector to communicate with a communication counterpart other than the projector even in a case where the external instrument does not have a plurality of communication paths.

Solution to Problem

To achieve the object described above, the invention relates to a projector including a projection section that projects an image, a communication section that wirelessly communicates with a first apparatus and communicates with a second apparatus, an evaluation section that determines a destination of communication data received via the communication section, and a control section that controls the projector, in a case where the evaluation section determines that the destination of the communication data is the projector, in which the control section causes the projection section to project an image based on image data included in the communication data, and in a case where the evaluation section determines that the destination of the communication data received from the first apparatus is not the projector, the control section causes the communication section to transmit the communication data to the second apparatus.

According to the invention, the function of the projector allows an apparatus that wirelessly communicates with the projector to transmit and receive data to and from an apparatus other than the projector.

In the invention, in the projector described above, in a case where the evaluation section determines that the destination of the communication data received from the second apparatus is the first apparatus, the control section causes the communication section to transmit the communication data to the first apparatus.

According to the invention, communication data can be transmitted from the second apparatus to the first apparatus without disconnection of the communication between the projector 1 and the first apparatus.

In the invention, in the projector described above, in a case where the evaluation section determines that the destination of the communication data received from the first apparatus is the projector, the control section causes the projection section to project an image based on the image data included in the communication data.

According to the invention, the projector can project an image based on data transmitted to the projector by the first apparatus, which wirelessly communicates with the projector.

In the invention, in the projector described above, in a case where the evaluation section determines that the destination of the communication data received from the first apparatus is not the projector, the control section replaces the communication data with communication data including information representing that the projector is a source and causes the communication section to transmit the replaced communication data to the second apparatus.

According to the invention, the first apparatus, which wirelessly communicates with the projector, can transmit communication data to the second apparatus without disconnection of the communication with the projector.

In the invention, in the projector described above, the control section replaces the communication data received from the second apparatus with communication data including information representing that the projector is a source and causes the communication section to transmit the replaced communication data to the first apparatus.

According to the invention, communication data can be transmitted from the second apparatus to the first apparatus without disconnection of the communication between the projector and the first apparatus.

In the invention, in the projector described above, the communication section transmits and receives communication data including identification information assigned as information representing a destination and a source to an apparatus, first identification information and second identification information are assigned to the projector, the evaluation section determines the destination of communication data received by the communication section from the first apparatus based on the destination identification information in the communication data, in a case where the evaluation section determines that the destination of the communication data received from the first apparatus is the first identification information, the control section extracts image data from the communication data and projects the image data, and in a case where the evaluation section determines that the destination of the communication data received from the first apparatus is not the first identification information, the control section replaces the source identification information in the communication data with the second identification information and causes the communication section to transmit the replaced communication data to the second apparatus.

According to the invention, the plurality of pieces of identification information assigned to the projector can be used to efficiently perform the action of receiving image data and projecting an image and the action of transmitting communication data received from the first apparatus to the second apparatus. Further, the source of communication data can be readily changed by replacing the identification information on the source of the communication data received from the first apparatus with any of the pieces of identification information assigned to the projector.

In the invention, in the projector described above, the communication section transmits and receives the communication data including an IP address as the identification information representing the destination or the identification information representing the source.

According to the invention, data can be readily transmitted and received by using the IP addresses assigned to the projector.

In the invention, in the projector described above, the communication section transmits and receives the communication data including an MAC (media access control) address as the identification information representing the destination or the identification information representing the source.

According to the invention, data can be readily transmitted and received by using the MAC addresses of the projector.

In the invention, in the projector described above, the projector further includes a storage section that stores information on communication data transmitted to the second apparatus via the communication section, and that the evaluation section determines the destination of the communication data received from the second apparatus based on the information stored in the storage section.

According to the invention, the destination of the communication data received by the projector from the second apparatus can be determined without depending only on the identification information. Therefore, for example, in a case where the projector transmits communication data received from the first apparatus to the second apparatus, communication data transmitted as a reply to the communication data from the second apparatus can be determined as communication data the destination of which is the first apparatus. In this case, the communication data as a reply to the communication data transmitted by the first apparatus can be reliably transmitted to the first apparatus.

In the invention, in the projector described above, the communication section is connected to a first network and a second network, communicates with the first apparatus over the first network, and communicates with the second apparatus over the second network.

According to the invention, the projector can transmit and receive communication data to and from each of the first apparatus and the second apparatus connected to the different communication networks.

In the invention, in the projector described above, the communication section communicates with the first apparatus by using network identification information that identifies the first network and communicates with the second apparatus by using a network identification information that identifies the second network.

According to the invention, the projector can identify each of the communication networks based on the network identification information and transmit and receive communication data to and from each of the first apparatus and the second apparatus.

In the invention, in the projector described above, the communication section communicates over the second network with a router apparatus that connects the second network to another network and functions as the second apparatus.

According to the invention, the projector can perform communication using another network via the second apparatus.

To achieve the object described above, the invention relates to a method for controlling a projector including a projection section that projects an image, the method including causing the projector to wirelessly communicate with a first apparatus and communicate with a second apparatus, determining a destination of received communication data, projecting an image based on image data included in the communication data in a case where the destination of the communication data is determined to be the projector, and transmitting the communication data to the second apparatus in a case where the destination of the communication data received from the first apparatus is determined not to be the projector.

According to the invention, the function of the projector allows an apparatus that wirelessly communicates with the projector to transmit and receive data to and from an apparatus other than the projector.

The invention may be implemented as a program that allows a computer that controls the projector to carryout the control method described above.

The invention may instead be implemented as a recording medium that records the program described above in such a way that a computer can read the program.

DESCRIPTION OF EMBODIMENTS

Figure 1:
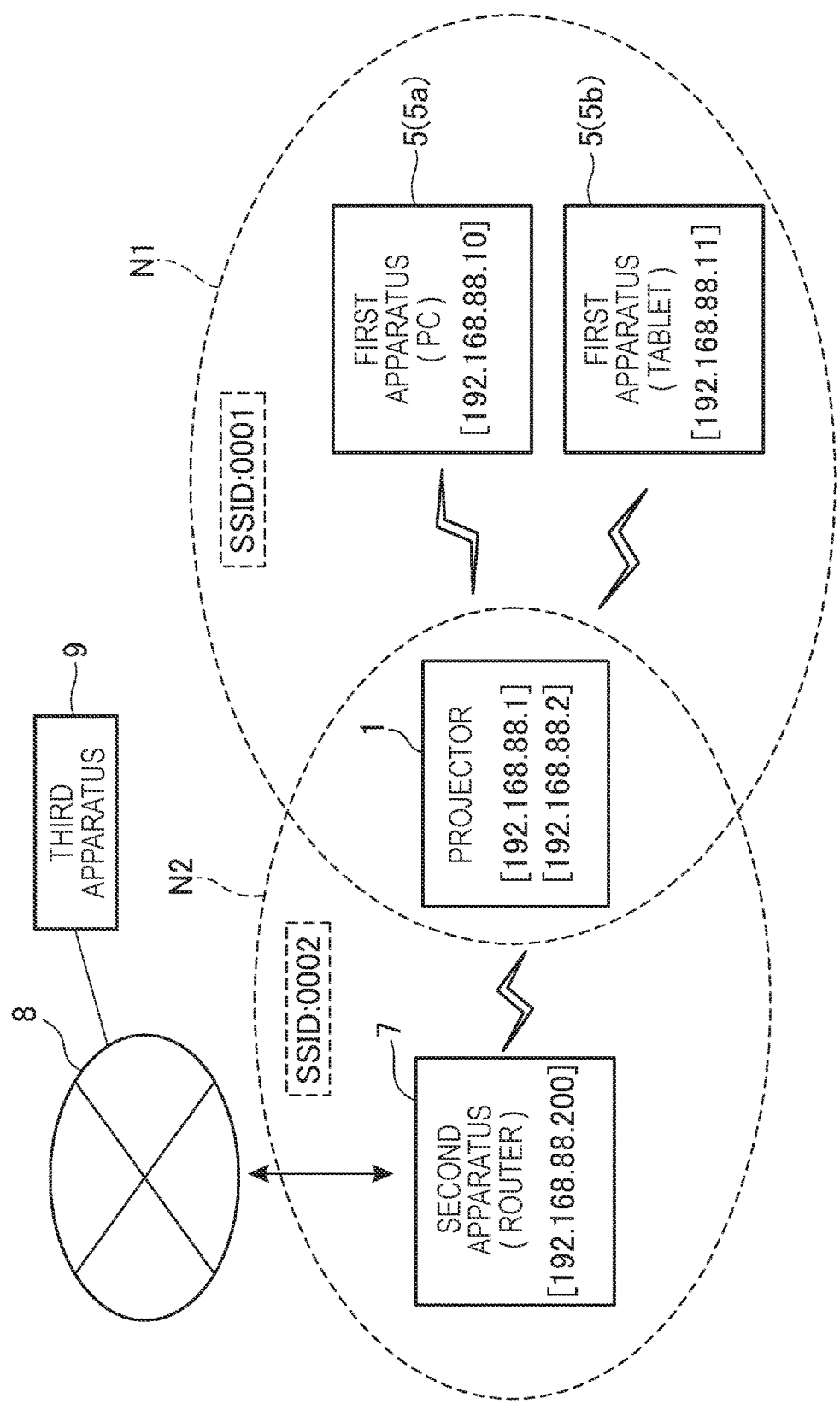
FIG. 1 is a configuration diagram of a communication system using a projector according to an embodiment.

FIG. 1 is a configuration diagram of a communication system using a projector 1.

The projector 1 as a display apparatus is so connected to a first apparatus 5 as an external image supply apparatus as to be capable of data communication with the first apparatus 5. The first apparatus 5 is an apparatus that supplies the projector 1 with image data. The first apparatus 5 only needs to be an apparatus capable of performing wireless data communication with the projector 1 to supply the projector 1 with image data, and the first apparatus 5 does not necessarily have a specific aspect. The image data supplied by the first apparatus 5 may be still image data or motion image (video images) data and may include voice data, and the data format and other factors of the image data may be arbitrarily determined. The first apparatus 5 is, for example, a personal computer (PC) or a video reproduction apparatus that reproduces video image data recorded on a recording medium. In the present embodiment, a PC 5a and a tablet 5b, the latter of which is a tablet-type personal computer, are presented as examples of the first apparatus 5, and the PC 5a and the tablet 5b are collectively called the first apparatus 5.

The projector 1 performs wireless data communication with the first apparatus 5, receives image data transmitted by the first apparatus 5 over the wireless communication, and projects an image based on the received image data on a screen SC (FIG. 2) or any other target object. The target object is the screen SC, which is a flat surface, in the present embodiment and may instead be an object that is not uniformly flat, such as a building, or may be an object having a flat projection surface, such as a wall surface of a building.

The projector 1 is further so connected to a second apparatus 7 as to be capable of performing data communication with the second apparatus 7. Examples of the second apparatus 7 may include an apparatus that forms a network facility, such as a router, a personal computer, and a server apparatus, and the second apparatus 7 only needs to be an apparatus capable of data communication and data processing.

In the present embodiment, a configuration in which the projector 1 is connected to the second apparatus 7 over wireless communication is presented by way of example. A configuration in which the projector 1 is connected to the second apparatus 7 via a wire for wired communication may instead be employed.

The second apparatus 7 is connected to a communication network 8. The communication network 8 is an open network, such as the Internet, or a closed network, such as a LAN (local area network). The second apparatus 7 performs data communication over the communication network 8 with a server apparatus (not shown) or any other instrument connected to the communication network 8. For example, the second apparatus 7 is a router apparatus that connects a wireless network N2 to the communication network 8, and the router apparatus and the projector 1 communicate with each other over the wireless network N2.

The projector 1 and the first apparatus 5 form a wireless network N1, as shown in FIG. 1. Further, the projector 1 and the second apparatus 7 form the wireless network N2. The wireless networks N1 and N2 each have an SSID (service set identifier) set as network identification information. In the example shown in FIG. 1, the SSID of the wireless network N1 is "0001," and the SSID of the wireless network N2 is "0002."

The wireless network N1 corresponds to a first network, and the wireless network N2 corresponds to a second network.

The form of the connection between the projector 1 and the first apparatus 5 and the form of the connection between the projector 1 and the second apparatus 7 are each an arbitrarily form. For example, assume a case in which the wireless networks N1 and N2 are each formed of a Wi-Fi (registered trademark) network. In this case, the projector 1, the first apparatus 5, and the second apparatus 7 may communicate with one another in an infrastructure mode in which the projector 1 serves as a master apparatus (what is called access point). They may instead communicate with one another in an ad-hoc mode, or they may instead be connected to one another by Wi-Fi Direct (registered trademark).

In the example shown in FIG. 1, the projector 1, the first apparatus 5, and the second apparatus 7 each have an IP (Internet Protocol) address that belongs to the same network. That is, the projector 1, the first apparatus 5, and the second apparatus 7 belong to a private network having a 24-bit network address "192.168.88." In this example, the IP address of the PC 5a is "192.168.88.10," and the IP address of the tablet 5b is "192.168.88.11." The IP address of the second apparatus 7 is "192.168.88.200." The projector 1 has two IP addresses "192.168.88.1" and "192.168.88.2."

The projector 1, the first apparatus 5, and the second apparatus 7 belong to the same private network. However, the first apparatus 5 and the second apparatus 7, when connected to the wireless networks N1 and N2, which have different SSIDs, respectively, cannot perform direct wireless communication with each other. To allow the first apparatus 5 and the second apparatus 7 to be directly wirelessly connected to each other, they need to be disconnected from the wireless networks N1 and N2.

In the present embodiment, in which the projector 1 uses the wireless networks N1 and N2 to communicate with the first apparatus 5 and the second apparatus 7, the first apparatus 5 and the second apparatus 7 can perform data communication with each other.

A third apparatus 9 is connected to the communication network 8. The third apparatus is an apparatus that performs data communication with an apparatus connected to the communication network 8 and is, for example, a server apparatus. The third apparatus 9 in the present embodiment performs data communication with the second apparatus 7 connected to the communication network 8. For example, when the second apparatus 7 transmits control data on data transmission request to the third apparatus 9, the third apparatus 9 receives the control data and transmits requested data to the second apparatus 7.

Since the second apparatus 7 functions as a router, the first apparatus 5 can transmit data to the third apparatus 9. In this case, when the first apparatus 5 transmits data to the third apparatus 9, the data is in fact transmitted from the first apparatus 5 to the second apparatus 7. The second apparatus 7 performs a relay function and transmits the data received from the first apparatus 5 to the third apparatus 9 over the communication network 8. Further, when the third apparatus 9 transmits response data in response to the data transmitted from the first apparatus 5 to the third apparatus 9, the second apparatus 7 relays the response data. The second apparatus 7 receives the data transmitted by the third apparatus 9 and transmits the data to the first apparatus 5 over the wireless network N2.

Figure 2:
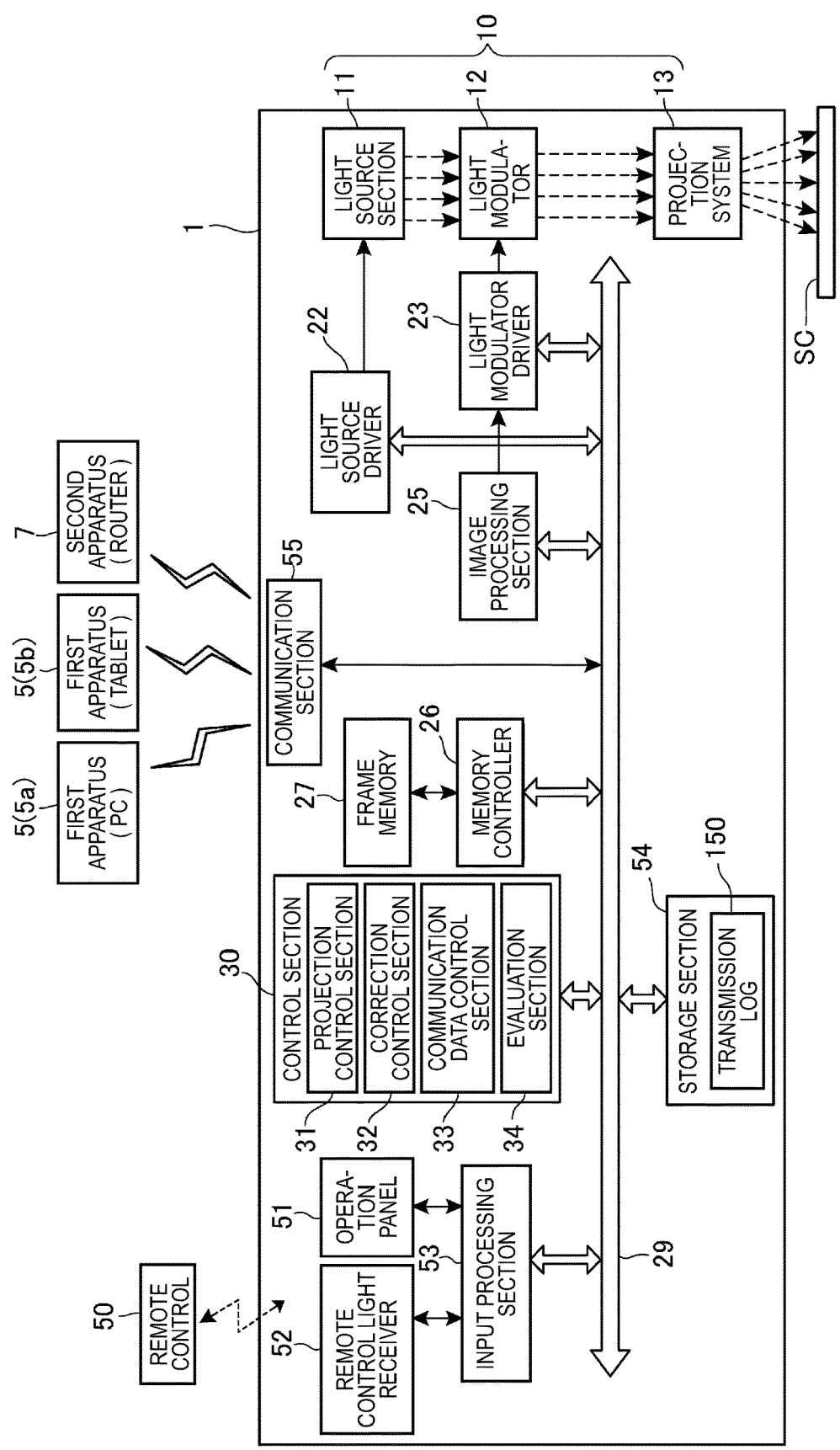
FIG. 2 is a block diagram showing the configuration of the projector.

FIG. 2 is a block diagram showing the configuration of the projector 1.

The projector 1 includes a communication section 55, which serves as an interface that connects the projector 1 to the first apparatus 5 and the second apparatus 7. The projector 1 receives image data transmitted by the first apparatus 5 via the communication section 55 and projects an image on the screen SC based on the received image data.

The projector 1 includes a projection section 10, which forms an optical image and projects and displays the image, and an image processing system that electrically processes the image displayed by the projection section 10.

The projection section 10 includes a light source section 11, a light modulator 12, and a projection system 13.

The light source section 11 includes a light source formed, for example, of a xenon lamp, an ultrahigh-pressure mercury lamp, or an LED (light emitting diode). The light source section 11 may include a reflector and an auxiliary reflector that guide light emitted by the light source to the light modulator 12. The light source section 11 may further include a lens group for enhancing the optical characteristics of the projected light, a polarizer, or a light adjusting element that is disposed in the path leading to the light modulator 12 and attenuates the amount of the light emitted by the light source (none of the components described above is shown).

The light modulator 12 includes a transmissive liquid crystal panel having a plurality of pixels arranged in a matrix and modulates the light emitted by the light source. The light modulator 12 is driven by a light modulator driver 23 and forms an image by changing the light transmittance in each of the pixels arranged in a matrix in the liquid crystal panel.

The projection system 13 includes a zoom lens that enlarges and reduces an image to be projected and performs focal point adjustment, a focus adjustment mechanism that adjusts focusing, and other components. The projection system 13 projects the image light modulated by the light modulator 12 on the target object to form an image.

A light source driver 22 and the light modulator driver 23 are connected to the projection section 10. The light source driver 22 and the light modulator driver 23 are connected to a control section 30 via a bus 29.

The light source driver 22 operates under the control of the control section 30 and drives the light source provided in the light source section 11. The light modulator driver 23 operates under the control of the control section 30 and drives the light modulator 12 based on an image signal inputted from an image processing section 25 to draw an image on the liquid crystal panel.

The image processing system of the projector 1 primarily includes the control section 30, which controls the projector 1, and further includes a storage section 54, the image processing section 55, a memory controller 26, and a frame memory 27. The control section 30, the storage section 54, the image processing section 25, and the memory controller 26 are connected to the bus 29.

The control section 30 is formed, for example, of a CPU (central processing unit), a ROM (read only memory), and a RAM (random access memory), none of which is shown. The control section 30 causes the CPU to execute a basic control program stored in the ROM and a control program stored in the storage section 54 to control the projector 1. In this case, the CPU of the control section 30 corresponds to a computer that executes the programs to control the projector 1. Further, the control section 30 executes the control program stored in the storage section 54 to perform the functions of a projection control section 31, a correction control section 32, a communication data control section 33, and an evaluation section 34.

The projection control section 31 controls the light source driver 22, the light modulator driver 23, and the image processing section 25 to cause them to project an image based on inputted image data on the target object.

The correction control section 32 controls the image processing section 25 to cause it to carry out the process of correcting the image data. For example, when an input processing section 53 detects a geometric correction instruction issued by a remote control 50 or an operation panel 51, the correction control section 32 controls the image processing section 25 to cause it to carry out a geometric correction process.

The image processing section 25 acquires image data inputted via the communication section 55 under the control of the control section 30. The image processing section 25 determines the image size and resolution of the image data acquired via the communication section 55, evaluates whether the image data is data on still images or motion images, and determines the frame rate and other attributes of the image data when the image data in motion image data. The image processing section 25 develops the acquired image data in the frame memory 27 via the memory controller 26 and performs image processing on the developed image data. The image processing section 25 reads the processed image data from the frame memory 27, produces RGB image signals corresponding to the read image data, and outputs the image signals to the light modulator driver 23. Processes carried out by the image processing section 25 are, for example, a scaling process, a geometric correction process, and a luminance correction process. The image processing section 25 may combine a plurality of the processes described above with one another and carry out the combined process.

The operation panel 51 including a variety of switches operated by a user is disposed in a main body of the projector 1. The operation panel 51 is connected to the input processing section 53. The operation panel 51 may include an indicator lamp.

The input processing section 53 is connected to the control section 30 via the bus 29. The input processing section 53, when it detects the user's operation of a switch on the operation panel 51, outputs an operation signal corresponding to the operated and detected switch to the control section 30.

Further, the input processing section 53 causes the indicator lamp on the operation panel 51 to keep illuminating or blink in accordance with the action state and setting state of the projector 1 under the control of the control section 30.

The projector 1 includes the remote control 50, which is configured as a component separate from the main body of the projector 1 and used by the user. The remote control 50 includes a variety of switches operated by the user, detects the user's operation of a switch, and transmits an infrared signal. The main body of the projector 1 includes a remote control light receiver 52, which receives the infrared signal issued by the remote control 50. The remote control light receiver 52 is connected to the input processing section 53 and outputs a signal corresponding to the infrared signal received from the remote control 50 to the input processing section 53. The input processing section 53 produces an operation signal representing the content of the operation performed on the remote control 50 based on the signal inputted from the remote control light receiver 52 and outputs the operation signal to the control section 30.

The storage section 54 is a storage device that stores data and programs in a non-volatile manner and is formed of a semiconductor memory device, such as a flash memory, or a magnetic recordable device. The storage section 54 stores data processed by the control section 30 and the control program executed by the control section 30.

The storage section 54 stores connection information. The "connection information" is information on an apparatus that is connected as the image supply apparatus to the projector 1 and outputs image data to the projector 1. In the present embodiment, the first apparatus 5 including the PC 5a and the tablet 5b are connected as the image supply apparatus to the projector 1. The storage section 54 stores the connection information on the PC 5a and the tablet 5b and may store the connection information on another first apparatus 5. Examples of the connection information on an image supply apparatus may include the IP address, the computer name, the MAC address of the image supply apparatus, or any other piece of information that identifies the image supply apparatus on a network. The connection information allows identification of the image supply apparatus on the network. Further, the connection information may have key information used in an encryption process and/or a decryption process in a case where the projector 1 communicates with the image supply apparatus with wireless data encrypted. The storage section 54 may store the SSID of an external instrument to be wirelessly connected to the projector 1. The connection information stored in the storage section 54 is used when the communication section 55 performs data communication with the image supply apparatus under the control of the control section 30.

The storage section 54 further stores a transmission log 150. The transmission log 150 includes information on a packet transmitted by the communication section 55 under the control of the communication data control section 33, which will be described later. Specifically, the transmission log 150 includes the IP address of the destination (address) of the packet, packet identification information, which will be described later, the protocol and port number associated with the packet, and other pieces of information.

The communication section 55 is a communication interface that performs data communication with an instrument, such as the first apparatus 5 (PC 5a, tablet 5b) and the second apparatus 7, as described above, and the communication section 55 is configured as a wireless communication interface in the present embodiment.

Figure 3:
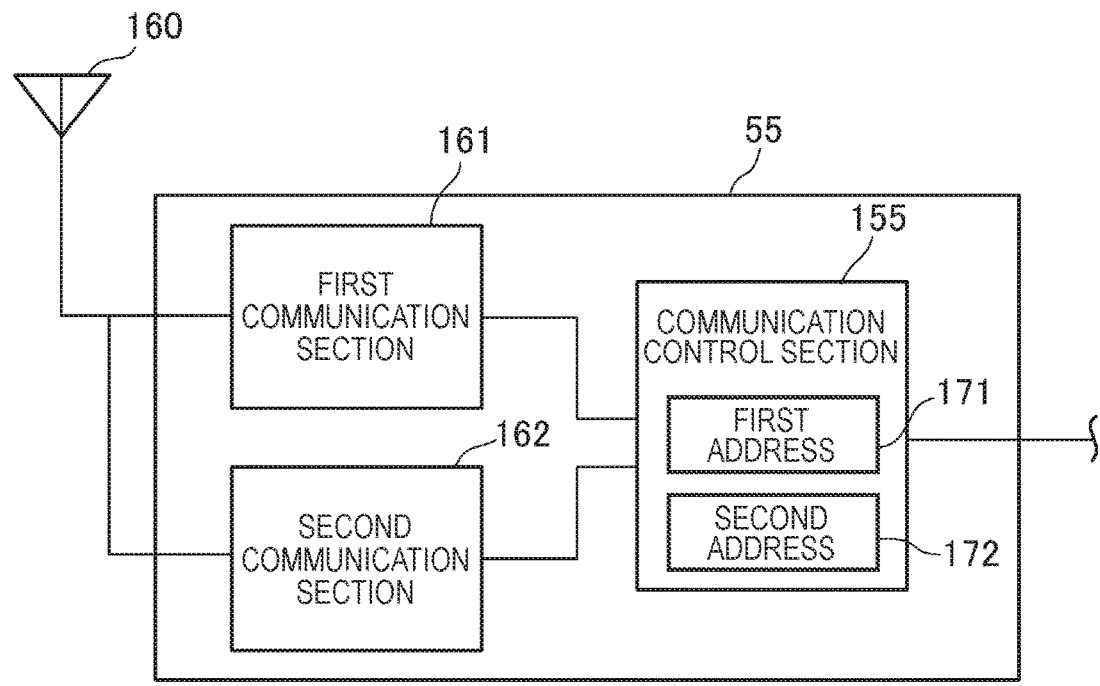
FIG. 3 is a block diagram showing a functional configuration of a communication section.

FIG. 3 is a block diagram showing the configuration of the communication section 55.

The communication section 55 includes an antenna 160, a first communication section 161, a second communication section 162, and a communication control section 155, as shown in FIG. 3.

The first communication section 161 and the second communication section 162 are each a wireless communication interface circuit that performs wireless communication under the control of the communication control section 155 and may each include an RF (radio frequency) circuit, a baseband circuit, and other circuits, none of which is shown. The present embodiment is not limited to a case where the first communication section 161 and the second communication section 162 perform communication over a wireless LAN. For example, a short-range wireless communication scheme, such as UWB (ultra-wide band), Bluetooth (registered trademark), and infrared communication, may be employed. Still instead, the communication may be performed based on a wireless communication scheme using a mobile phone line.

The first communication section 161 and the second communication section 162 can be wirelessly connected to respective different instruments for data communication. In the present embodiment, the first communication section 161 is connected to the first apparatus 5 and communicates therewith, and the second communication section 162 is connected to the second apparatus 7 and communicates therewith.

A configuration in which the first communication section 161 performs wireless communication but no wire communication may be employed, or a configuration in which the second communication section 162 performs wired communication but no wireless communication may be employed.

FIG. 3 shows an exemplary configuration in which the first communication section 161 and the second communication section 162 share the antenna 160. In the configuration, the first communication section 161 and the second communication section 162 may share one physical layer and one data link layer. That is, the first communication section 161 and the second communication section 162 may share an RF circuit and a baseband section that are not shown as well as the antenna 160. In this case, the first communication section 161 and the second communication section 162 may perform communication by using a common MAC (media access control) address.

Instead, the communication section 55 may include a plurality of antennas, and the first communication section 161 and the second communication section 162 may be connected to antennas different from each other. In this case, the first communication section 161 and the second communication section 162 may each include an RF circuit and a baseband section that are not shown.

The second communication section 162 may include a wired LAN interface and may be wired to the second apparatus 7 via the wired LAN interface. In this case, the second communication section 162 may perform no wireless communication.

The first communication section 161 and the second communication section 162 may each be configured as independent hardware, or the communication control section 155, the first communication section 161, the second communication section 162, and peripheral circuits thereof may be integrated with one another into a hardware unit. Instead, part or the entirety of the first communication section 161, the second communication section 162, and the communication control section 155 may be achieved by executing predetermined software on hardware.

In the present embodiment, the communication section 55 performs packet communication between the first apparatus 5 and the second apparatus 7.

The first communication section 161 receives a communication data packet transmitted by the first apparatus 5 and outputs the packet to the communication control section 155, whereas the first communication section 161 wirelessly transmits a communication data packet outputted by the communication control section 155 to the first apparatus 5. The second communication section 162 receives a communication data packet transmitted by the second apparatus 7 and outputs the packet to the communication control section 155, whereas the second communication section 162 wirelessly transmits a communication data packet outputted by the communication control section 155 to the second apparatus 7.

The communication control section 155, when it performs communication via the first communication section 161 and the second communication section 162, uses two addresses specified as the source and destination of a packet. The first address 171 is, for example, "192.168.88.1" shown in FIG. 1 by way of example, and the second address 172 is, for example, "192.168.88.2" shown in FIG. 1 by way of example.

The communication section 55 can receive both a packet the destination of which is the first address 171 and a packet the destination of which is the second address 172.

A packet produced by the communication control section 155 includes the first address 171 or the second address 172 as the source address.

The first communication section 161 and the second communication section 162 each independently performs wireless data communication by using a predetermined SSID under the control of the communication control section 155. In the present embodiment, the first communication section 161 performs wireless communication by using the SSID "0001" of the wireless network N1 (FIG. 1), and the second communication section 162 performs wireless communication by using the SSID "0002" of the wireless network N2 (FIG. 1). That is, the first communication section 161 performs wireless communication with the first apparatus 5, and the second communication section 162 performs wireless communication with the second apparatus 7.

In this case, the SSIDs "0001" and "0002" are set in the communication control section 155 under the control of the control section 30, and the communication control section 155 assigns the SSIDs to the first communication section 161 and the second communication section 162. In a case where a code, such as a pass phrase (password) corresponding to an SSID, is used in each of the wireless networks N1 and N2, the control section 30 sets the code in the communication control section 155.

The present embodiment is described with reference to the case where the first address 171 is assigned to the first communication section 161 and the second address 172 is assigned to the second communication section 162 in the communication section 55. The present embodiment is not limited to the case where the first address 171 and the second address 172 are always assigned to the first communication section 161 and the second communication section 162, respectively.

The communication control section 155 outputs data included in a payload of a packet received by each of the first communication section 161 and the second communication section 162 to the control section 30 via the bus 29. Further, the communication control section 155 produces a packet that carries transmission data inputted from the control section 30 and causes the first communication section 161 or the second communication section 162 to transmit the packet.

Referring back to FIG. 2, the communication data control section 33 controls the communication section 55 to cause it to perform processing on a packet and control the first communication section 161 and the second communication section 162. The communication data control section 33 assigns IP addresses (first address 171, second address 172) to the communication section 55, sets SSIDs, sets codes corresponding to the SSIDs, and other types of operation.

The evaluation section 34 determines the destination of communication data 100 transmitted and received via the communication section 55.

Figure 4:
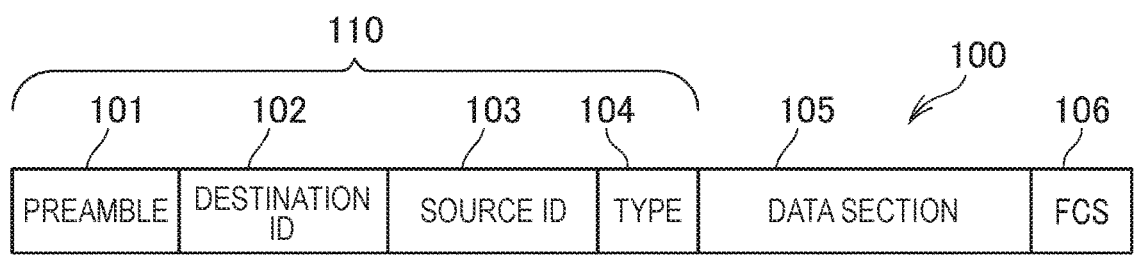
FIG. 4 is a diagrammatic view showing the configuration of communication data transmitted and received by the projector.

FIG. 4 is a diagrammatic view showing the configuration of the communication data 100 transmitted and received by the projector 1.

The communication data 100 is a packet having a predetermined length defined in advance or a free length. The communication data 100 includes, as a typical configuration, a header 110 including a preamble 101, a destination ID 102, a source ID 103, and a type 104, a data section 105, and an FCS (frame check sequence) 106.

The preamble 101 includes a physical header including, for example, a signal that controls synchronization with the data transmission/reception timing. The destination ID 102 includes identification information that identifies the destination (address) of the communication data 100, for example, the IP address and/or MAC address of the destination. The source ID 103 includes identification information that identifies the source of the communication data 100, for example, the IP address and/or MAC address of the source.

The following description will be made with reference to the case where the identification information included as each of the destination ID 102 and the source ID 103 is the IP address. The first address 171 corresponds to first identification information, and the second address 172 corresponds to second identification information. The above assumption is merely an example, and the identification information may instead be the MAC address or any other information thereon.

The type 104 includes the overall length of the packet, the protocol number associated therewith, and other pieces of information thereon. The data section 105 is a payload that stores actual data to be transmitted and received in the form of the packet. The FCS 106 is data used to detect and correct an error in the communication data 100.

The communication performed in the communication system including the projector 1 shows in FIG. 1 is broadly classified into the following four:

(1) The first apparatus 5 transmits image data to the projector 1.

In this case, the first apparatus 5 transmits communication data 100 including image data to the projector 1, and the projector 1 extracts the image data from the data section 105 of the received communication data 100 and projects an image based on the extracted image data. In this case, the destination ID 102 in the communication data 100 transmitted by the first apparatus 5 is the IP address of the projector 1, and the source ID 103 is the IP address of the first apparatus 5.

Having received the image data from the first apparatus 5, the projector 1 may transmit reception acknowledgement data representing that the image data has been received. In this case, the destination ID 102 in the reception acknowledgement communication data 100 is the IP address of the first apparatus 5, and the source ID 103 of the reception acknowledgement communication data 100 is the IP address of the projector 1.

(2) The first apparatus 5 transmits data to the second apparatus 7.

Communication of this type is performed, for example, in a case where transmission and reception of control data are performed between the first apparatus 5 and the second apparatus 7 and a case where the first apparatus 5 transmits a data acquisition request to an external instrument connected to the communication network 8 (third apparatus 9, for example).

In a case where the second apparatus 7 operates as a gateway to (router for) the communication network 8, the second apparatus 7 relays data communication over the communication network 8. The first apparatus 5, when it transmits communication data 100 to the third apparatus 9, temporarily sets the second apparatus 7 as the destination. Specifically, the destination ID 102 in the communication data 100 transmitted by the first apparatus 5 is not the IP address of the third apparatus 9 or any other IP address but is the IP address of the second apparatus 7.

Since the first apparatus 5 and the second apparatus 7 form the wireless networks N1 and N2 having different SSIDs, respectively, as described above, the first apparatus 5 cannot wirelessly transmit the communication data 100 directly to the second apparatus 7. The first apparatus 5 therefore transmits the communication data 100 the destination of which is the second apparatus 7 (communication data 100 including destination ID 102 representing IP address of second apparatus 7) to the projector 1.

(3) The second apparatus 7 transmits data to the first apparatus 5.

In the case where the first apparatus 5 transmits a data acquisition request to the third apparatus 9, the first apparatus 5 transmits communication data 100 to the second apparatus 7, as described in aforementioned (2).

The second apparatus 7 has the router function and connects the wireless network N2 to another network (communication network 8 in the present embodiment). The second apparatus 7 routes the communication data 100 transmitted by the first apparatus 5 in terms of destination and transmits the communication data transmitted by the first apparatus 5 to the third apparatus 9. In the relay action, the second apparatus 7 replaces the address of the destination of the communication data. Specifically, the second apparatus 7 changes the destination ID 102 in the communication data 100 received from the first apparatus 5 from the IP address of the second apparatus 7 to the IP address of the third apparatus 9 and transmits the communication data 100 to the communication network 8. In this process, the second apparatus 7 may replace the source ID 103 with the IP address of the second apparatus 7. The communication data 100 is received by the third apparatus 9, and the third apparatus 9 transmits response data to the first apparatus 5. The response data is a response to the source ID 103 in the communication data 100 received by the third apparatus 9 from the second apparatus 7. The destination ID 102 in the communication data 100 as the response data is therefore the IP address of the second apparatus 7, and the communication data 100 is transmitted by the third apparatus 9 and received by the second apparatus 7. The second apparatus 7 then determines that the communication data 100 received from the third apparatus 9 is response data corresponding to the first apparatus 5 and transmits the communication data 100 to the first apparatus 5. The second apparatus 7 performs the data relay function also when transmitting the response data. Specifically, the second apparatus 7 changes the destination ID 102 in the communication data 100, which is the response data, from the IP address of the second apparatus 7 to the IP address of the first apparatus 5 and transmits the communication data 100.

Further, in the action described in (2), when the first apparatus 5 transmits the communication data 100 to the second apparatus 7, the second apparatus 7 transmits response data to the first apparatus 5.

As described above, transmission of the communication data 100 from the second apparatus 7 to the first apparatus 5 occurs both when the third apparatus 9 transmits data (response data, for example) to the first apparatus 5 and when the second apparatus 7 transmits data to the first apparatus 5.

In (2) described above, the destination ID 102 in the communication data 100 transmitted by the first apparatus 5 to the projector 1 is not the IP address of the projector 1 (first address 171 or second address 172) but is the IP address of the second apparatus 7 or the third apparatus 9. The source ID 103 in the communication data 100 is the IP address of the first apparatus 5.

In (3) described above, the destination ID 102 in the communication data 100 transmitted by the second apparatus 7 to the projector 1 is not the IP address of the projector 1 but is the IP address of the first apparatus 5. The source ID 103 in the communication data 100 is the IP address of the second apparatus 7.

That is, in the action in (2) and (3), the projector 1 receives a packet the destination of which is not the first address 171 or the second address 172. In other words, the IP address of the projector 1, which is the apparatus that actually receives the communication data 100, differs from the destination ID 102 or the source ID 103 included in the packet of the communication data 100. The difference may undesirably cause the packet to be discarded depending on the specifications of the projector 1, the first apparatus 5, and the second apparatus 7.

To avoid the problem described above, when the projector 1 transmits (forwards) the communication data 100 received from the first apparatus 5 to the second apparatus 7 in the action in (2), the projector 1 uses the function of the communication data control section 33 of the control section 30 to replace the source ID 103 with the second address 172. The action described above allows the second apparatus 7 to receive the communication data the source of which is the projector 1.

Therefore, when the second apparatus 7 produces and transmits the response data in the action in (3), the second apparatus 7 produces communication data 100 including the second address 172 as the destination ID 102 and transmits the communication data 100 to the projector 1. Further, when the third apparatus 9 produces and transmits the response data in the action in (3), the second apparatus 7 relays (forwards) the communication data 100 as the response data received from the third apparatus 9 to the second address 172 as the destination. Specifically, the second apparatus 7 replaces the destination ID 102 in the communication data 100 received from the third apparatus 9 with the second address 172 and transmits the communication data 100 to the projector 1.

As described above, the response data transmitted by the second apparatus 7 or the third apparatus 9 includes the second address 172 as the destination ID 102 and is transmitted to the projector. Since the destination ID 102 coincides with the address of the apparatus that actually receives the communication data (projector 1), there is no concern about discard of the packet, whereby the projector 1 can reliably receive the communication data 100.

Further, the control section 30 of the projector 1 causes the evaluation section 34 to evaluate whether or not communication data 100 received by the communication section 55 is communication data that should be transmitted (forwarded) to the first apparatus 5.

To achieve the function described above, the communication data control section 33, when it replaces the source ID 103 with the second address 172 in the action in (2), records in the transmission log 150 in the storage section 54 that the source ID 103 has been replaced.

The contents recorded in the transmission log 150 include packet identification information that identifies the packet of the replaced communication data 100. Examples of the packet identification information may include the address of the destination of a packet transmitted by the projector 1, the date and time when the packet is transmitted, and a unique number imparted to the packet. In a case where a number unique to the packet is used as the packet identification information, the communication data control section 33 may produce the number when the source ID 103 is replaced and include the number in the header 110 (type 104 in FIG. 4, for example). In this case, when the second apparatus 7 or the third apparatus 9 produces communication data 100 as the response data, the header 110 of the communication data 100 includes the packet identification information. For example, in a case where the second apparatus 7 or the third apparatus 9 receives communication data 100 including packet identification information "1001" and responds thereto, the header 110 of the response communication data 100 includes data representing that the communication data 100 is a response to the packet identification information "1001." The evaluation section 34 can therefore evaluate based on the transmission log 150 whether or not the communication data 100 received by the second communication section 162 is a response to the communication data 100 including a source ID 103 having been replaced before.

In a case where the evaluation section 34 determines that the communication data 100 received by the second communication section 162 is a response corresponding to the communication data 100 including a source ID 103 replaced by the communication data control section 33, the communication data control section 33 transmits (forwards) the communication data 100 to the first apparatus 5. In this case, the communication data control section 33 may replace the source ID 103 of the communication data 100 to be transmitted to the first apparatus 5 with the second address 172. As described above, in the case where the projector 1 receives communication data 100 transmitted by the first apparatus 5 to an apparatus other than the projector 1, the communication data 100 can be reliably transmitted to the intended destination. Further, as a response to the communication data 100, communication data 100 is transmitted by the apparatus, and the projector 1 can receive and reliably transmit the response communication data 100 to the first apparatus 5.

(4) The second apparatus 7 transmits data to the projector 1.

The second apparatus 7 transmits data for setting wireless communication, setting data on the action of the projector 1, data broadcast in the wireless network N2, or any other data to the projector 1 in some cases. Further, the second apparatus 7 transmits data for updating software for the projector 1 (what is called firmware) to the projector 1 in some cases. In this case, the second apparatus 7 transmits communication data 100 including a destination ID 102 representing the IP address of the projector 1. The projector 1 causes the second communication section 162 to receive the communication data 100 transmitted from the second apparatus 7 and carries out a process corresponding to the received communication data 100. For example, the control section 30 extracts data from the payload of the received communication data 100 and carries out a setting process based on the extracted data, a software update process based thereon, or the process of producing communication data 100 that is a response to the second apparatus 7 and transmitting the communication data 100 from the second communication section 162.

As described above, the control section 30 carries out a process based on the communication data 100 received by the communication section 55, as described in aforementioned (1) and (4). The control section 30 further analyzes the communication data 100 received by the communication section 55, and the evaluation section 34 determines the source and destination of the communication data 100 in (2) and (3) described above. The evaluation section 34 may perform the evaluation based on the address indicated by the source ID 103 in the received communication data 100. In a case where the header 110 includes information that identifies the source apparatus (such as computer name), the evaluation section 34 may perform the evaluation based on the information. The evaluation section 34 may instead determine the source based on whether or not the communication data 100 has been received by the first communication section 161 or the second communication section 162. Specifically, the source of the communication data 100 received by the first communication section 161 corresponding to the wireless network N1 is determined to be the first apparatus 5. Similarly, the source of the communication data 100 received by the second communication section 162 corresponding to the wireless network N2 is determined to be the second apparatus 7.

The evaluation section 34 determines the destination of the communication data received from the second apparatus 7 based on the transmission log 150 stored in the storage section 54.

The communication data control section 33 has the function of analyzing communication data 100 received by the communication section 55 and replacing the source ID 103 and/or the destination ID 102 included in the communication data 100 to produce communication data 100 for transmission. The communication data 100 for transmission produced by the communication data control section 33 is transmitted by the communication section 55.

Figure 5:
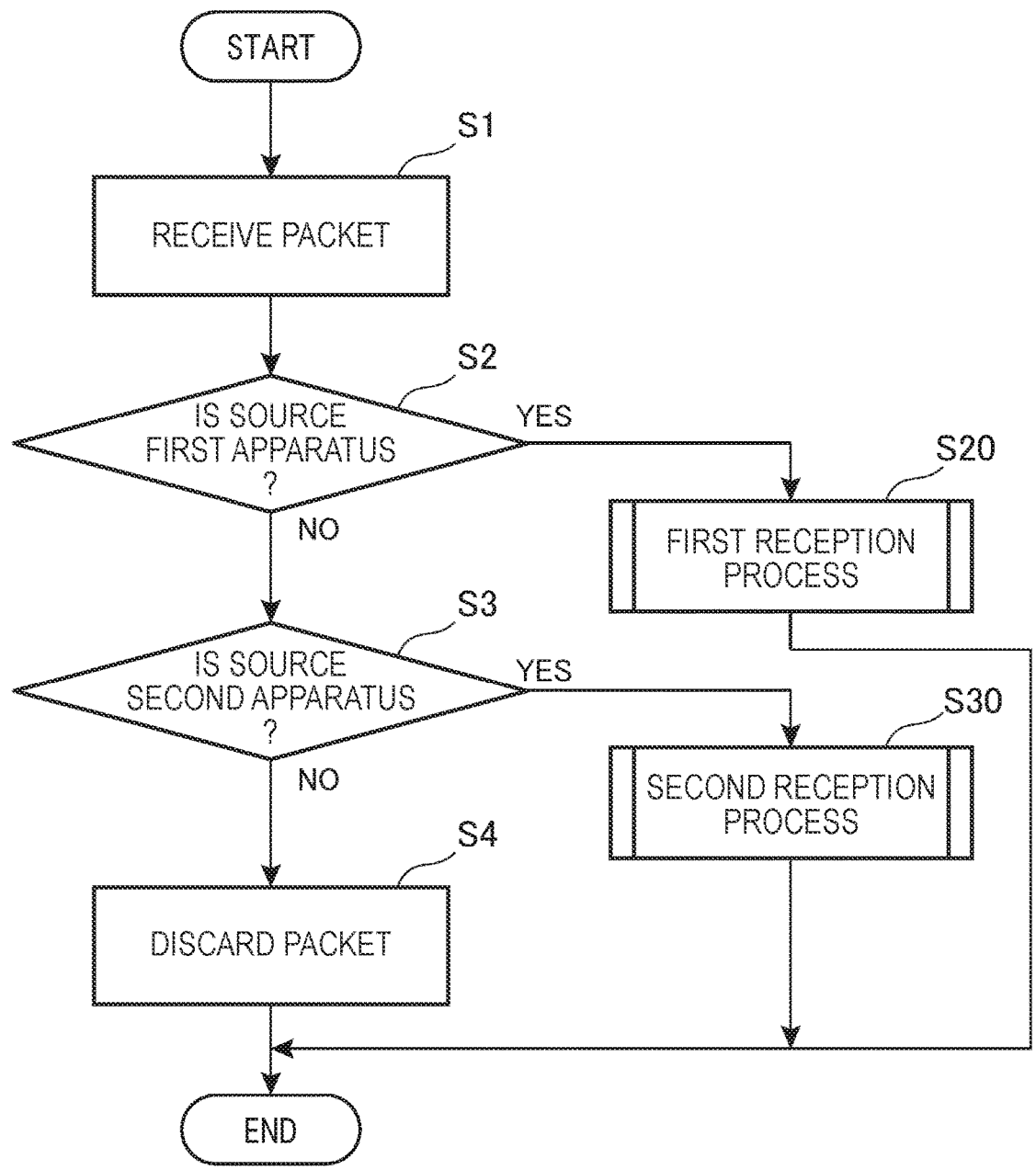
FIG. 5 is a flowchart showing the action of the projector.

FIG. 5 is a flowchart showing the action of the projector 1, particularly the action thereof in the case where the projector 1 receives communication data 100.

The projector 1 receives communication data 100 from an external apparatus via the communication section 55 and uses the function of the evaluation section 34 to determine the source and destination of the received communication data 100 under the control of the control section 30 (step S1). The evaluation section 34 determines a substantial source and destination of the communication data 100 received by the communication section 55. The substantial source is not limited to the instrument having transmitted the communication data 100 to the projector 1. In the case where the projector 1 receives relayed communication data 100, the evaluation section 34 determines as the source the instrument having transmitted the communication data 100 before it is relayed. In the case where the projector 1 relays the received communication data 100, the evaluation section 34 determines as the substantial destination the instrument at the destination (address) to which the communication data 100 is relayed. It can therefore be said that the substantial destination refers to an instrument or an apparatus that the projector 1 should consider as the source, and that the substantial source refers to an instrument or an apparatus that the projector 1 should consider as the source.

The control section 30 evaluates whether or not the source of the received communication data 100 is the first apparatus 5 based on the result of the evaluation performed by the evaluation section 34 (step S2). In a case where the evaluation section 34 determines that the source is the first apparatus 5 (Yes in step S2), the control section 30 carries out a first reception process (step S20). In a case where the evaluation section 34 determines that the source is not the first apparatus 5 (No in step S2), the control section 30 evaluates whether or not the source of the received communication data 100 is the second apparatus 7 (step S3).

In a case where the evaluation section 34 determines that the source is the second apparatus 7 (Yes in step S3), the control section 30 carries out a second reception process (step S30). In a case where the evaluation section 34 determines that the source is not the second apparatus 7 (No in step S3), the control section 30 discards the packet of the received communication data 100 (step S4) and terminates the present procedure.

Figure 6:
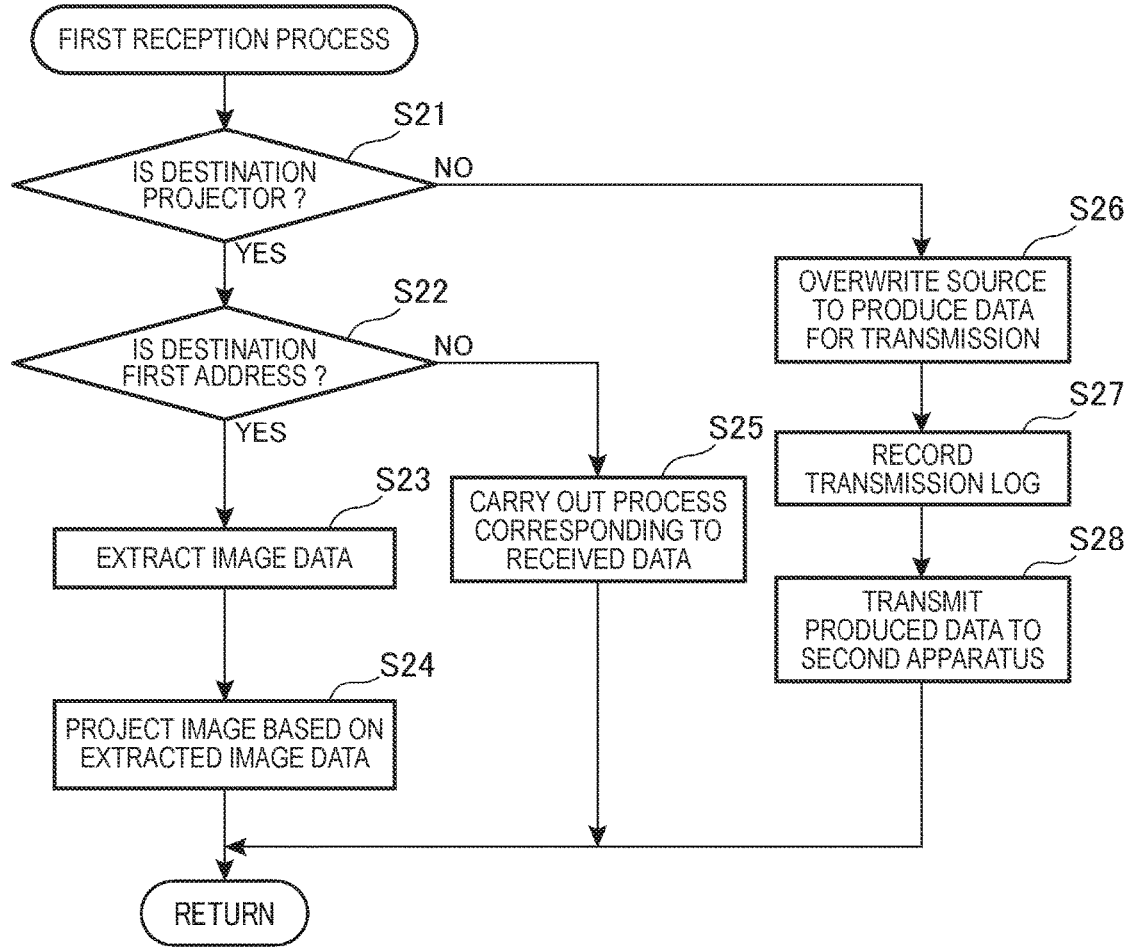
FIG. 6 is a flowchart showing the action of the projector.

FIG. 6 is a flowchart showing the action of the projector 1 and shows in detail the first reception process shown in step S20 in FIG. 5.

The control section 30 evaluates whether or not the destination of the communication data 100 received in step S1 (FIG. 5) is the projector 1 based on the result of evaluation performed by the evaluation section 34 (step S21).

For example, the evaluation section 34 evaluates whether the destination of the received communication data 100 is the projector 1 based, for example, on whether or not the destination ID 102 in the communication data 100 is the first address 171 or the second address 172.

In a case where the result of the evaluation shows that the destination is the projector 1 (Yes in step S21), the control section 30 evaluates whether or not the destination is the first address 171 (step S22). The first address 171 is the address used in data communication for reception of image data, and the second address 172 is the address used in data communication for reception of data other than image data.

In step S21, the evaluation section 34 may perform the evaluation based on whether or not the destination ID 102 is the first address 171. Instead, the evaluation section 34 may evaluate whether or not the destination is the first address 171 based on whether or not the first communication section 161 has received the communication data 100. The evaluation is effective in the case where the first address 171 is assigned to the first communication section 161.

In a case where the result of the evaluation shows that the destination is the first address 171 (Yes in step S22), the control section 30 extracts image data from the communication data 100 (step S23). The control section 30 then controls each portion of the projector 1 to cause the projection section 10 to project an image based on the image data extracted from the communication data 100 on the screen SC (step S24).

On the other hand, in a case where the result of the evaluation shows that the destination of the received communication data 100 is not the first address 171, that is, the destination is the second address 172 (No in step S22), the control section 30 carries out a process corresponding to the received communication data 100 (step S25). For example, the control section 30 carries out a setting process based on the received communication data 100, a software update process based thereon, or the process of producing communication data 100 that is a response to the second apparatus 7 and transmitting the communication data 100 from the second communication section 162.

In a case where the result of the evaluation shows that the destination of the communication data 100 is not the projector 1 (No in step S21), the control section 30 uses the function of the communication data control section 33 to replace the source ID 103 of the communication data 100 to produce communication data 100 for transmission (step S26).

The control section 30 records information on the produced communication data 100 for transmission in the transmission log 150 (step S27) and controls the communication section 55 to cause it to transmit the communication data 100 produced in step S26 to the second apparatus 7 via the second communication section 162 (step S28).

Figure 7:
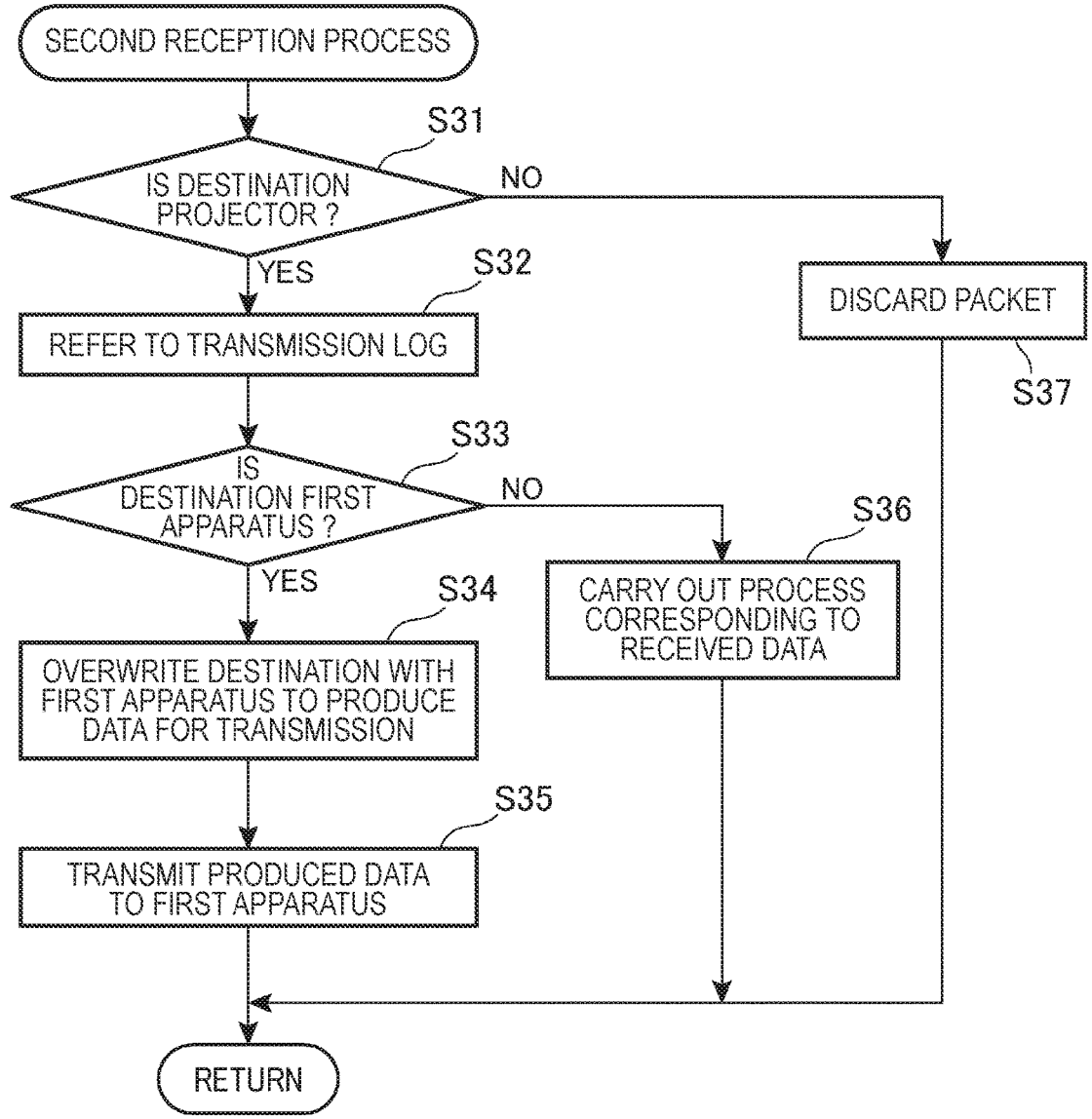
FIG. 7 is a flowchart showing the action of the projector.

FIG. 7 is a flowchart showing the action of the projector 1 and shows in detail the second reception process shown in step S30 in FIG. 5.

The control section 30 evaluates whether or not the destination of the communication data 100 received in step S1 (FIG. 5) is the projector 1 based on the result of evaluation performed by the evaluation section 34 (step S31).

In a case where a result of the evaluation shows that the destination is the projector 1 (Yes in step S31), the control section 30 refers to the transmission log 150 (step S32) and evaluates whether or not the substantial destination of the communication data 100 is the first apparatus 5 (step S33). In a case where the result of the evaluation shows that the substantial destination is the first apparatus 5 (Yes in step S33), the control section 30 uses the function of the communication data control section 33 to replace the source ID 103 in the communication data 100 with the second address 172 to produce communication data 100 for transmission (step S34). The control section 30 transmits the produced communication data 100 to the first apparatus 5 via the first communication section 161 (step S35).

In a case where the result of the evaluation shows that the substantial destination of the communication data 100 is not the first apparatus 5 (No in step S33), the control section carries out a process corresponding to the received communication data 100 (step S36). For example, the control section 30 carries out a setting process or a software update process based on the communication data 100.

In a case where the result of the evaluation shows that the destination is not the projector 1 (No in step S31), the control section 30 determines that it is not necessary to process the communication data received by the second communication section 162 and discards the received packet (step S37).

As described above, the projector 1 can wirelessly communicate with the first apparatus 5, such as the PC 5a and the tablet 5b, via the first communication section 161, extract image data included in communication data 100 transmitted from the first apparatus 5, and projects an image. Further, the projector 1 can wirelessly communicate with the first apparatus 5 and/or the second apparatus 7, such as a router, and transmit and receive communication data 100 to and from the first apparatus 5 and/or the second apparatus 7 via the second communication section 162. Moreover, the projector 1 relays communication data transmission between the first apparatus 5 and the second apparatus 7 via the second communication section 162 under the control of the control section 30. That is, the projector 1 functions as a wireless access point having a bridging function and a routing function. The PC 5a and the tablet 5b can therefore supply the projector 1 with an image and keep accessing the Internet or an intranet. The PC 5a and the tablet 5b can therefore refer to data stored in a storage device provided in the second apparatus 7 or the third apparatus 9 and cause the projector 1 to project an image based on of the data. In this case, the PC 5a and the tablet 5b can, for example, access the third apparatus 9 via the second apparatus 7 while transmitting image data to the projector 1.

As described above, the projector 1 according to the present embodiment includes the projection section 10, which projects an image, the communication section 55, the control section 30, and the evaluation section 34. The communication section 55 wirelessly communicates with the first apparatus 5 and communicates with the second apparatus 7. The evaluation section 34 determines the destination of communication data 100 received by the communication section 55. In the case where the evaluation section 34 determines that the destination of the communication data 100 is the projector 1, the control section 30 causes the projection section 10 to project an image based on image data included in the communication data 100. In the case where the evaluation section 34 determines that the destination of the communication data 100 received from the first apparatus 5 is not the projector 1, the control section causes the communication section 55 to transmit the communication data to the second apparatus 7.

As a result, the first apparatus 5, which wirelessly communicates with the projector 1, can use the function of the projector 1 to transmit and receive data to and from an apparatus other than the projector 1, such as the second apparatus 7.

In a projector 1, in the case where the evaluation section 34 determines that the destination of communication data 100 received from the second apparatus 7 via the communication section 55 is the first apparatus 5, the control section 30 causes the communication section 55 to transmit the communication data 100 to the first apparatus 5. The communication data 100 can thus be transmitted from the second apparatus 7 to the first apparatus 5 without disconnection of the communication between the projector 1 and the first apparatus 5.

In the case where the evaluation section 34 determines that the destination of communication data 100 received from the first apparatus 5 is the projector 1, the control section 30 causes the projection section 10 to project an image based on image data included in the communication data 100. The projector 1 can thus project an image based on data transmitted by the first apparatus 5 to the projector 1.

In the case where the evaluation section 34 determines that the destination of the communication data 100 received from the first apparatus 5 is not the projector 1, the control section 30 replaces the communication data 100 with communication data 100 including information representing that the projector 1 is the source. Since the control section 30 causes the communication section 55 to transmit the replaced communication data 100 to the second apparatus 7, the first apparatus 5 can transmit the communication data 100 to the second apparatus 7 without disconnecting the communication with the projector 1.

The control section 30 may instead replace the communication data 100 received from the second apparatus 7 with communication data 100 including information representing that the projector 1 is the source and cause the communication section 55 to transmit the replaced communication data 100 to the first apparatus 5. In this case, the communication data 100 can be transmitted from the second apparatus 7 to the first apparatus 5 without disconnection of the communication between the projector 1 and the first apparatus 5.

The communication section 55 transmits and receives communication data 100 including IP addresses assigned to an apparatus as information representing the destination and the source. The first address 171 and the second address 172 are assigned to the projector 1. The evaluation section 34 determines the destination of communication data 100 received from the first apparatus 5 via the communication section 55 based on the IP address indicated by the destination ID 102 included in the communication data 100. In the case where the evaluation section 34 determines that the destination of the communication data 100 received from the first apparatus 5 is the first address 171, the control section 30 extracts image data from the communication data 100 and projects the image data. In the case where the evaluation section 34 determines that the destination of the communication data 100 received from the first apparatus 5 is not the first address 171, the control section 30 replaces the IP address indicated by the source ID 103 included in the communication data 100 and causes the communication section 55 to transmit the communication data 100 to the second apparatus 7. A plurality of the IP addresses assigned as identification information to the projector 1 can therefore be used to efficiently perform the action of receiving image data and projecting an image and the action of transmitting communication data 100 received from the first apparatus 5 to the second apparatus 7. Further, the source of communication data 100 can be readily changed by replacing the source ID 103 in the communication data 100 received from the first apparatus 5 with either of the IP addresses assigned to the projector 1.

Since the communication section 55 transmits and receives communication data 100 including an IP address as the identification information representing the destination or identification information representing the source, the data can be readily transmitted and received by use of the IP addresses assigned to the projector 1.

The communication section 55 may instead transmit and receive communication data 100 including an MAC address as the identification information representing the source or the identification information representing the destination. In this case, the data can be readily transmitted and received by use of the MAC addresses of the projector 1.

The projector 1 includes the storage section 54, which stores the transmission log 150 including information on communication data 100 transmitted via the communication section 55 to the second apparatus 7. The evaluation section 34 may determine the destination of communication data 100 received from the second apparatus 7 based on the transmission log 150 stored in the storage section 54. In this case, the destination of the communication data 100 received by the projector 1 from the second apparatus 7 can be determined without depending only on the identification information, such as the IP address. Therefore, for example, in a case where the projector 1 transmits communication data 100 received from the first apparatus 5 to the second apparatus 7, the first apparatus can be determined as the substantial destination of communication data 100 transmitted as a response (reply) to the communication data 100 from the second apparatus 7. In this case, the communication data 100 as a reply to the communication data 100 transmitted by the first apparatus 5 can be reliably transmitted to the first apparatus 5.

The communication section 55 is connected to the wireless networks N1 and N2, communicates with the first apparatus 5 over the wireless network N1, and communicates with the second apparatus 7 over the wireless network N2. The projector 1 can therefore transmit and receive communication data 100 to and from each of the first apparatus 5 and the second apparatus 7 connected to the different communication networks.

The communication section 55 communicates with the first apparatus 5 by using the SSID of the wireless network N1 and communicates with the second apparatus 7 by using the SSID of the wireless network N2. The projector 1 can therefore identify each of the wireless networks based on the SSIDs and transmit and receive communication data to and from each of the first apparatus and the second apparatus.

Since the communication section 55 communicates with the second apparatus 7, which is a router apparatus that connects the wireless network N2 to the communication network 8, over the wireless network N2, the communication section 55 can perform communication using the communication network 8 via the second apparatus 7.

The embodiment described above is merely an example of a specific aspect to which the invention is applied and is therefore not intended to limit the invention, and the invention is applicable in an aspect different from the embodiment described above. For example, the aforementioned embodiment has been described with reference to the configuration in which three transmissive liquid crystal panels corresponding to RGB are used as the light modulators, but not necessarily in the invention. For example, reflective liquid crystal panels may be used. Further, for example, a method using the combination of one liquid crystal panel and a color wheel may be employed. Further, a method using three digital mirror devices (DMDs) that modulate the RGB color light fluxes may be employed. Still further, a method using the combination of one digital mirror device and a color wheel or other methods may be employed. When only one liquid crystal panel or DMD is used as a display section, no member corresponding to a light combining system, such as a cross dichroic prism, is necessary. Further, any light modulator that can modulate light emitted from a light source can be employed with no problem instead of a liquid crystal panel or a DMD.

Each of the functional portions shown in the block diagram of FIG. 2 represents a functional configuration of the projector 1 and is not necessarily implemented in a specific form. That is, hardware corresponding to each of the functional portions is not necessarily implemented, and a single processor that executes a program can, of course, achieve the functions of the plurality of functional portions. Further, in the embodiment described above, part of the functions achieved by software may be achieved by hardware, or part of the functions achieved by hardware may be achieved by software.

The action of the control section 30 described in the aforementioned embodiment can also be achieved in a form of a program. That is, the control section 30 may have a configuration including a CPU, a ROM, and a RAM, and the CPU may execute a program to achieve the method for controlling the projector 1 shown in FIGS. 5, 6, and 7. In this case, the CPU of the control section 30 corresponding to a computer that executes a program to control the projector 1. Instead, the CPU of the control section 30 may execute a program to perform part or the entirety of the projection control section 31, the correction control section 32, the communication data control section 33, and the evaluation section 34. Still instead, the CPU of the control section 30 may read the program described above from recording medium on which the program has been so recorded that a computer can read the program and may then execute the program.

Part or the entirety of the program described above may be achieved in the form of hardware. For example, each of the processing sections described above provided in the control section 30 may be formed of an ASIC (application specific integrated circuit). Instead, a programmed FPGA (field-programmable gate array) or any other programmed PLD (programmable logic device) may be used. Still instead, a circuit including a plurality of semiconductor device may be used. When the functions described above are achieved by hardware that executes a program, the program may be stored in the ROM in the control section 30, the storage section 54, or another storage device. Instead, the control section 30 may acquire a program stored in an external apparatus via the communication section 55 and execute the program.

REFERENCE SIGNS LIST

1: Projector, 5: First apparatus, 5a: PC, 5b: Tablet, 7: Second apparatus, 9: Third apparatus, 10: Projection section, 30: Control section, 31: Projection control section, 32: Correction control section, 33: Communication data control section, 34: Evaluation section, 54: Storage section, 55: Communication section, 100: Communication data, 150: Transmission log, 155: Communication control section, 161: First communication section, 162: Second communication section, 171: First address (first identification information), 172: Second address (second identification information), N1: Wireless network (first network), N2: Wireless network (second network), SC: Screen

The invention claimed is:

1. A projector comprising:
a lens that projects an image; and
a communication interface circuit that wirelessly communicates with a first apparatus and communicates with a second apparatus;
a processor programmed to:
determine a destination of communication data received via the communication interface circuit; and
control the projector, wherein
when the processor determines that the destination of the communication data is the projector, the processor is further programmed to cause the lens to project an image based on image data included in the communication data, and
when the processor determines that the destination of the communication data received from the first apparatus is not the projector, the processor is further programmed to cause the communication interface circuit to transmit the communication data to the second apparatus,
when the processor determines that the destination of the communication data received from the first apparatus is not the projector, the processor is further programmed to replace the communication data with communication data including information representing that the projector is a source and cause the communication interface circuit to transmit the replaced communication data to the second apparatus,
the communication interface circuit transmits and receives communication data including identification information assigned as information representing a destination and a source to an apparatus,
first identification information and second identification information are assigned to the projector,
the processor determines the destination of communication data received by the communication interface circuit from the first apparatus based on the destination identification information in the communication data,
when the processor determines that the destination of the communication data received from the first apparatus is the first identification information, the processor is further programmed to extract image data from the communication data and project the image data, and
when the processor determines that the destination of the communication data received from the first apparatus is not the first identification information, the processor is further programmed to replace the source identification information in the communication data with the second identification information and cause the communication interface circuit to transmit the replaced communication data to the second apparatus.

2. The projector according to claim 1, wherein
when the processor determines that the destination of the communication data received from the second apparatus is the first apparatus, the processor is further programmed to cause the communication interface circuit to transmit the communication data to the first apparatus.

3. The projector according to claim 1, wherein
when the processor determines that the destination of the communication data received from the first apparatus is the projector, the processor is further programmed to cause the lens to project an image based on the image data included in the communication data.

4. The projector according to claim 1, wherein
the processor is further programmed to replace the communication data received from the second apparatus with communication data including information representing that the projector is a source and cause the communication interface circuit to transmit the replaced communication data to the first apparatus.

5. The projector according to claim 1, wherein
the communication interface circuit transmits and receives the communication data including an IP address as the identification information representing the destination or the identification information representing the source.

6. The projector according to claim 1, wherein
the communication interface circuit transmits and receives the communication data including an MAC address as the identification information representing the destination or the identification information representing the source.

7. The projector according to claim 1, wherein
the projector further comprises a storage that stores information on communication data transmitted to the second apparatus via the communication interface circuit, and
the processor determines the destination of the communication data received from the second apparatus based on the information stored in the storage.

8. A projector comprising:
a lens that projects an image; and
a communication interface circuit that wirelessly communicates with a first apparatus and communicates with a second apparatus;
a processor programmed to:
 determine a destination of communication data received via the communication interface circuit; and
 control the projector, wherein
 when the processor determines that the destination of the communication data is the projector, the processor is further programmed to cause the lens to project an image based on image data included in the communication data, and
 when the processor determines that the destination of the communication data received from the first apparatus is not the projector, the processor is further programmed to cause the communication interface circuit to transmit the communication data to the second apparatus, wherein
 the communication interface circuit is connected to a first network and a second network, communicates with the first apparatus over the first network, and communicates with the second apparatus over the second network.

9. The projector according to claim 8, wherein
the communication interface circuit communicates with the first apparatus by using network identification information that identifies the first network and communicates with the second apparatus by using a network identification information that identifies the second network.

10. The projector according to claim 8, wherein
the communication interface circuit communicates over the second network with a router apparatus that connects the second network to another network and functions as the second apparatus.

11. A method for controlling a projector including a lens that projects an image, the method comprising:
 causing the projector to wirelessly communicate with a first apparatus and communicate with a second apparatus;
 determining a destination of received communication data;
 projecting an image based on image data included in the communication data when the destination of the communication data is determined to be the projector; and
 transmitting the communication data to the second apparatus when the destination of the communication data received from the first apparatus is determined not to be the projector;
 replacing the communication data with communication data including information representing that the projector is a source and causing the communication interface circuit to transmit the replaced communication data to the second apparatus, when the processor determines that the destination of the communication data received from the first apparatus is not the projector;
 transmitting and receiving communication data including identification information assigned as information representing a destination and a source to an apparatus;
 assigning first identification information and second identification information to the projector;
 determining the destination of communication data received by the communication interface circuit from the first apparatus based on the destination identification information in the communication data;
 extracting image data from the communication data and projecting the image data, when the processor determines that the destination of the communication data received from the first apparatus is the first identification information; and
 replacing the source identification information in the communication data with the second identification information and transmitting the replaced communication data to the second apparatus, when the processor determines that the destination of the communication data received from the first apparatus is not the first identification information.

* * * * *